US009281091B1

(12) United States Patent
Dionne et al.

(10) Patent No.: US 9,281,091 B1
(45) Date of Patent: Mar. 8, 2016

(54) METHOD AND STRUCTURE FOR PLASMONIC OPTICAL TRAPPING OF NANO-SCALE PARTICLES

(71) Applicant: The Board of Trustees of the Leland Stanford Junior University, Palo Alto, CA (US)

(72) Inventors: Jennifer Anne Dionne, Palo Alto, CA (US); Amr Ahmed Essawi Saleh, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 14/732,658

(22) Filed: Jun. 5, 2015

Related U.S. Application Data

(63) Continuation-in-part of application No. 14/209,904, filed on Mar. 13, 2014, now abandoned.

(60) Provisional application No. 61/779,528, filed on Mar. 13, 2013.

(51) Int. Cl.
*G21K 1/00* (2006.01)
*G02B 6/26* (2006.01)

(52) U.S. Cl.
CPC ............... *G21K 1/006* (2013.01); *G02B 6/264* (2013.01)

(58) Field of Classification Search
USPC ............................ 250/251; 385/43, 123, 129
See application file for complete search history.

(56) References Cited

U.S. PATENT DOCUMENTS

| | | |
|---|---|---|
| 2003/0235385 A1 | 12/2003 | Taylor et al. |
| 2010/0202734 A1 | 8/2010 | DeCorby |
| 2013/0064502 A1 * | 3/2013 | Peng et al. ................ 385/31 |

OTHER PUBLICATIONS

"U.S. Appl. No. 14/209,904", "Notice of Allowance", Mar. 5, 2015, Publisher: USPTO, Published in: US.
"U.S. Appl. No. 14/209,904", "Non-Final Office Action", Jan. 7, 2015, Publisher: USPTO, Published in: US.

* cited by examiner

*Primary Examiner* — Kiet T Nguyen
(74) *Attorney, Agent, or Firm* — Kaplan Breyer Schwarz & Ottesen, LLP

(57) ABSTRACT

Methods and article for optically trapping nano-sized objects by illuminating a coaxial plasmonic aperture are disclosed.

26 Claims, 13 Drawing Sheets

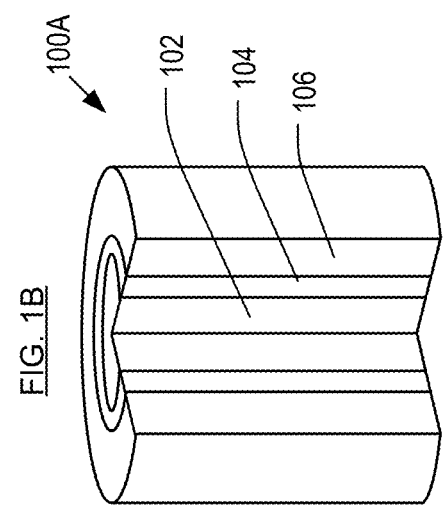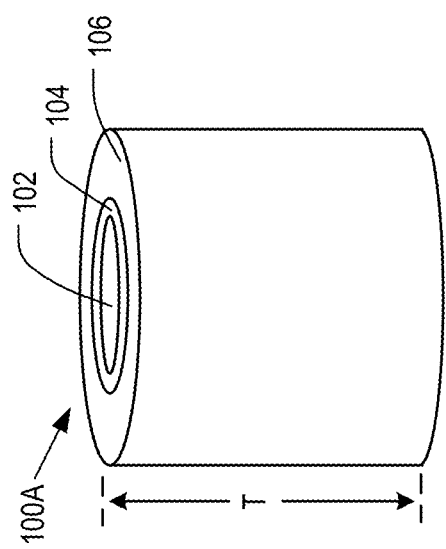

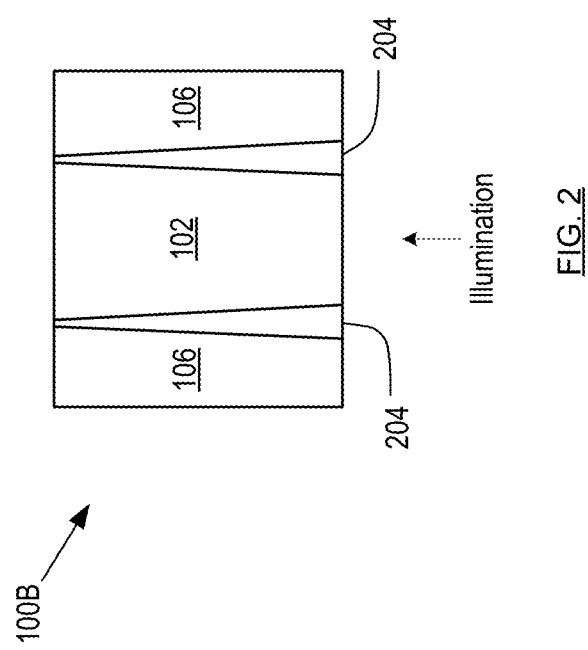

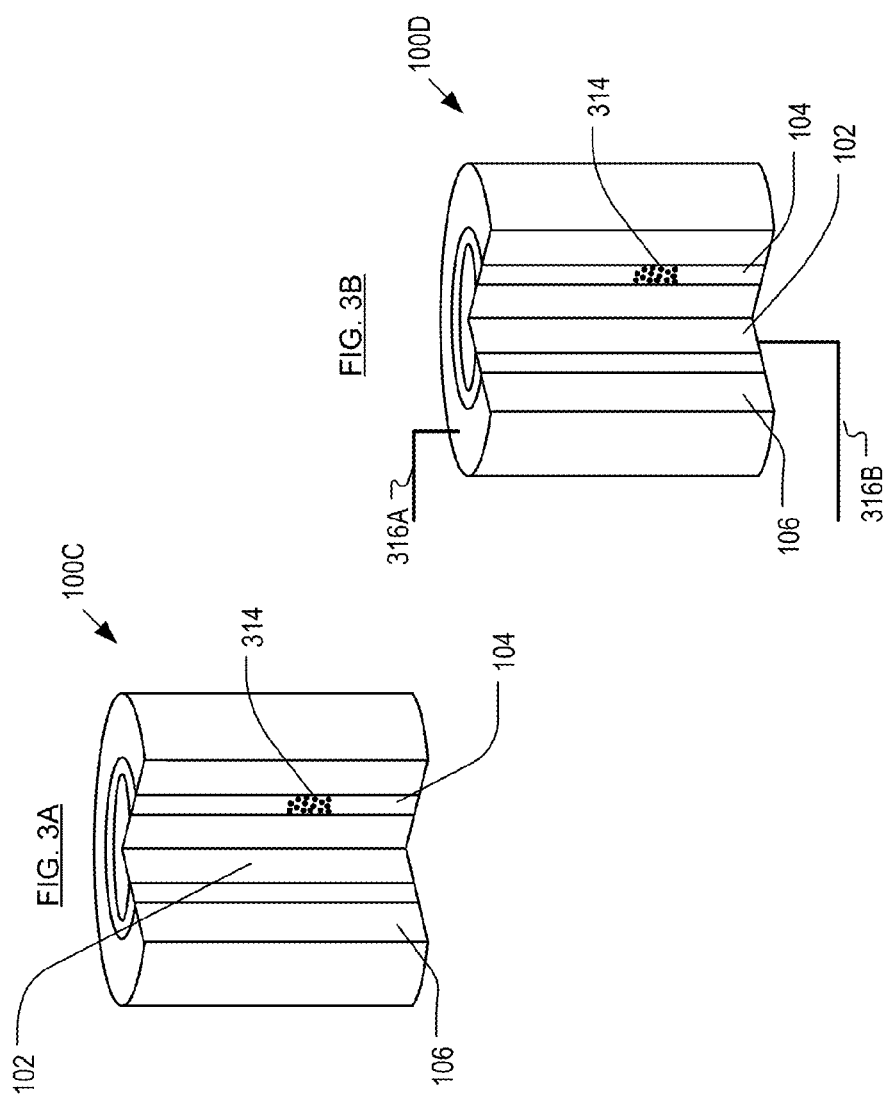

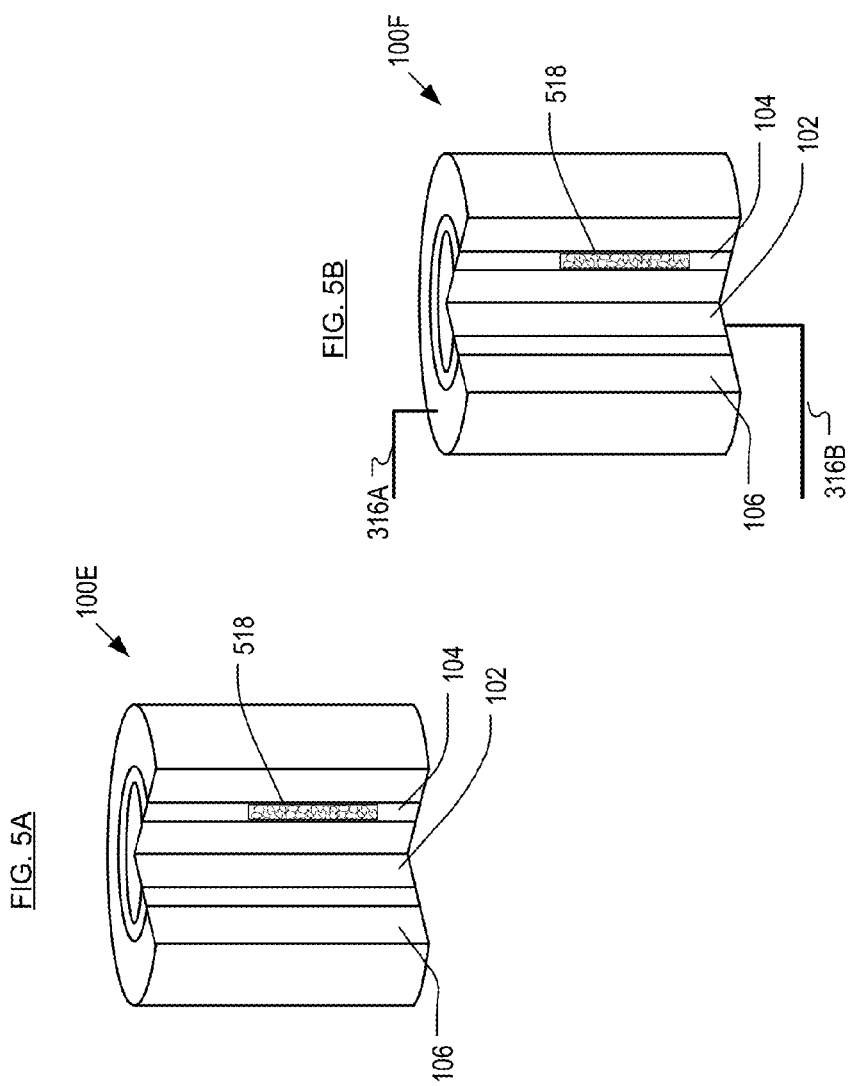

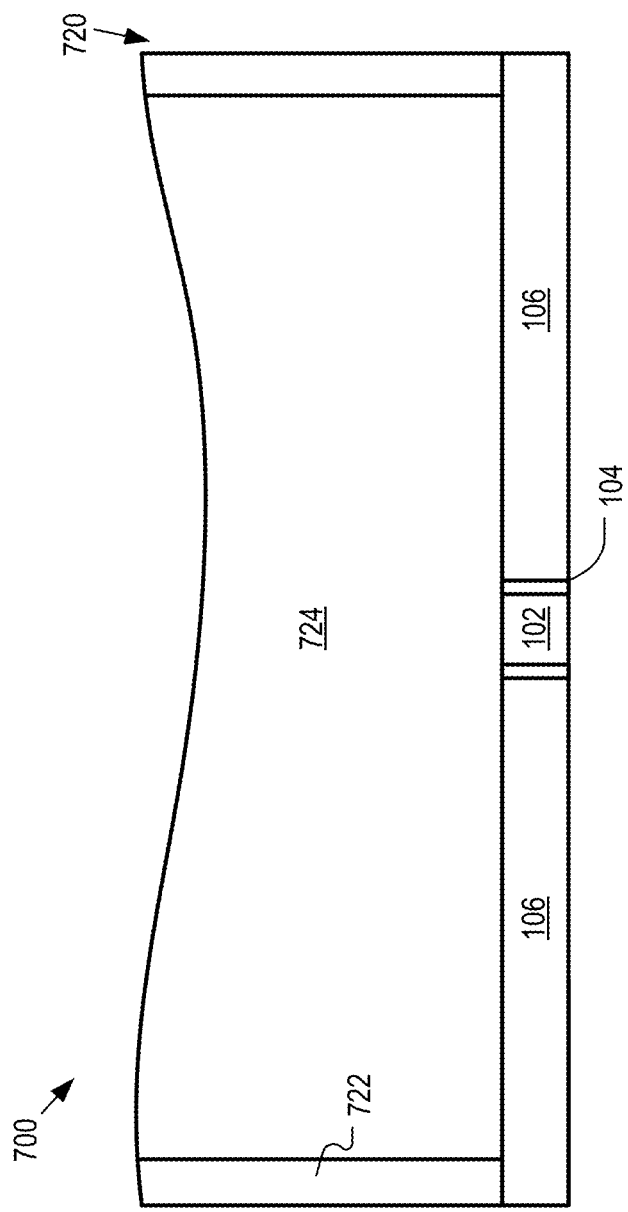

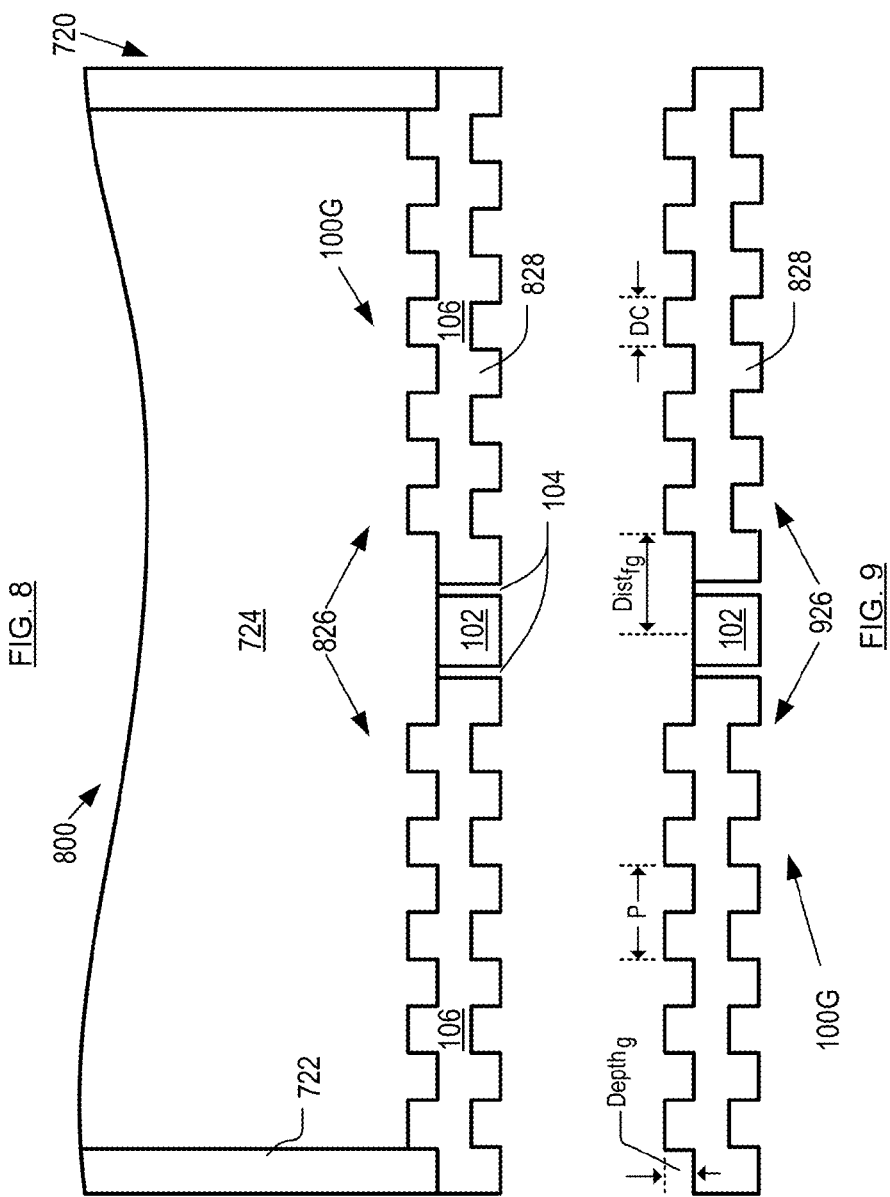

METHOD AND STRUCTURE FOR PLASMONIC OPTICAL TRAPPING OF NANO-SCALE PARTICLES

STATEMENT OF RELATED CASES

This case is a continuation-in-part of U.S. patent application Ser. No. 14/209,904 filed Mar. 13, 2014, which claims priority to U.S. Provisional Patent Application Ser. No. 61/779,528 filed on Mar. 13, 2013, both of which applications are incorporated by herein by reference.

STATEMENT REGARDING FEDERALLY-SPONSORED RESEARCH

This invention was made with Government support under contract FA9550-11-1-0024 awarded by the Air Force Office of Scientific Research. The Government has certain rights in the invention.

FIELD OF THE INVENTION

The present invention relates to optical trapping of nano-sized objects.

BACKGROUND OF THE INVENTION

Electromagnetic beams can serve as "tweezers," enabling small objects to be accelerated, manipulated, or trapped using light alone. Optical tweezers were first introduced in 1970, using a laser beam to trap dielectric beads in lower-refractive-index media. Upon interaction with the laser, the bead was both accelerated in the direction of the beam and drawn toward the regions of high optical intensity.

Optical tweezers are a powerful means of probing and controlling micrometer-scale objects. In the biosciences, for example, optical tweezers have been used for bacterial trapping as well as noninvasive manipulation of organelles and filaments within individual living cells. They have also been used to study bio-molecular systems and the physics of molecular motors, ranging from kinesin and myosin to the polymerases involved in DNA transcription and replication. Optical traps have further enabled cooling of neutral atoms as well as translation, rotation, and assembly of relatively large nanowires and nanoparticles.

Despite these advances, optical trapping and manipulation of individual particles with sizes smaller than the wavelength of light remains a considerable challenge. The problem is inherent to the light beam itself. Optical trapping typically uses light in the visible spectrum (i.e., wavelengths between 400 and 700 nanometers) so that the specimen can be seen as it is manipulated. Due to the diffraction limit of light, the smallest space in which optical tweezing can trap a particle is approximately half the wavelength of the light beam; in the visible spectrum, this is about 200 nanometers (nm). If the specimen in question is much smaller than 200 nm, only very loose control of the specimen is possible since, relative to its size, the specimen is being trapped in a much larger potential well.

Furthermore, the optical force that light can exert on an object diminishes as the size of an object decreases. More particularly, in the Rayleigh regime (i.e., particle size smaller than the wavelength of light), optical forces on spherical particles scale with the third power of the particle's radius. As a consequence, optical forces diminish very quickly as particle size is reduced. Since the diffraction limit constrains the achievable intensity gradient, overcoming this reduction in force typically requires an increase in the illuminating optical intensity. But there are constraints to increasing intensity; in particular, increased intensity can damage the sample. It has been predicted, for example, that a 1.5 W laser beam could trap particles between 9 and 14 nm in diameter, depending on the refractive index of the particle. But such high optical powers would rapidly burn the particle.

Researchers have tried to circumvent this size limitation by tethering nano-sized molecular specimens to micrometer-scale dielectric beads that can be stably trapped and manipulated. The problem with such an approach is that a molecule might behave quite differently when tethered to what is effectively giant anchor than it would when un-tethered.

Recently, a technique called "plasmonic" tweezing has been used to extend conventional optical trapping to the sub-optical-wavelength regime. Plasmonic traps rely on excitation of surface plasmon-polaritons, which result from the coupling of light with the mobile conduction electrons at the interface of a conductor and insulator. That is, when light interacts with these mobile electrons, the light is scattered and sculpted into electromagnetic waves called "plasmon-polaritons." These oscillations have a very short wavelength compared to visible light, enabling them to trap small specimens more tightly than is otherwise possible.

These electromagnetic modes are capable of confining light beyond the diffraction limit and are characterized by an exponential decay of electromagnetic fields away from the interface. These properties are very important for trapping applications; the former property significantly reduces the trapping volume, while the latter enhances the resulting optical forces due to the strong field gradient.

Several recent studies have demonstrated the feasibility of plasmonic optical trapping. In 2009, it was shown that plasmonic nano-antennas can trap 200 nm polystyrene particles using 300 mW (0.01 mW/$\mu m^2$) of illumination power. In 2011, trapping and rotation of 110 nm polystyrene beads were achieved using plasmonic nano-pillars with an illumination intensity of 10 mW/$\mu m^2$. More recently, trapping of 20 nm polystyrene particles was achieved within a plasmonic nano-cavity formed by a nano-pore and double nano-hole aperture. These demonstrations combined the plasmonic trap with "self-induced back action trapping," allowing the required illumination power to remain below 10 mW.

In the biosciences, nano-photonic and plasmonic structures have enabled optical trapping of λ-DNA molecules and a single bovine serum albumin molecule with a hydrodynamic radius of 3.4 nm. Theoretical studies have shown that optical trapping of particles as small as 10 nm is possible within silicon slot waveguides and hybrid plasmonic waveguides. However, efficient trapping of sub-10-nm particles still remains a considerable challenge.

SUMMARY OF THE INVENTION

The present invention provides a way to trap particles as small as about 2 nanometers.

In accordance with the illustrative embodiment, a coaxial plasmonic aperture is used to focus electromagnetic energy to a region much smaller than a diffraction-limited spot, thereby functioning as an optical trap for extremely small particles.

In accordance with the illustrative embodiment, the coaxial plasmonic aperture comprises a cylindrical core, a channel in the form of an annulus or ring that surrounds the core, and a cladding that covers the ring. In the illustrative embodiment, the core comprises silver and has a diameter of 120 nm, the channel comprises silicon dioxide and has a width of 25 nm, and the cladding comprises silver. The width of the cladding is arbitrary and is typically similar to the radius of the core. The length of the aperture is 150 nm.

In operation, a particle is positioned at one end of the aperture. The other end of the aperture is illuminated with light, such as from a laser. As light propagates through the silicon dioxide ring, it creates plasmons at the interface of the silver and silicon dioxide. The plasmons travel along the aperture and emerge at the other end as a powerful, concentrated beam of optical energy. The particle, which can be metallic or dielectric, interacts with the optical field and is thereby trapped.

The resulting optical forces on the particle vary with both the particle size and the dimensions of the aperture itself. Relatively thinner channels provide relatively stronger field confinement, thereby enabling the trapping of relatively smaller particles. In this regard, channels having a width as small as 5 nm have been created. Relatively thicker channels are suitable for trapping relatively larger particles. However, the channel should remain thin enough to maintain coupling between the plasmon surface waves at the two channel interfaces. In this regard, channel width should be no larger than about (i.e., +/−10%) 500 nm. It is very difficult to obtain theoretical closed-form relations for the coaxial plasmonic aperture (e.g., relating the size of a particle that can be trapped to the structure of the aperture, etc.) due to the complicated nature of the interaction between the particle and the near-field of the structure. As a consequence, finite difference time domain simulations are used to calculate the self-consistent fields and the corresponding force on a particle. Those skilled in the art will know how to use such techniques.

The transmittance spectrum of the coaxial plasmonic aperture will exhibit certain maxima that arise from Fabry-Perot resonances within the (finite thickness) aperture. In the illustrative embodiment, with the dimensions of the coaxial plasmonic aperture as indicated and when illuminated with a linearly polarized plane wave, these maxima—resonant plasmonic wavelengths—occur at wavelengths of 692 nm and 484 nm. Thus, the aperture effectively provides two discrete traps. This is mode of operation is particularly useful for applications in which a particle is to be precisely manipulated (e.g., studied, moved to a precise location, etc.). For a given core diameter, aperture length, and aperture materials, the thickness of the channel determines the resonant wavelength of the aperture.

In another mode of operation, circularly polarized light can be used. This results in a "donut" shaped trap and enables more particles to be trapped than when using linearly polarized light. Such a mode of operation is useful, for example, for filtration applications.

Unlike any other plasmonic traps, a coaxial plasmonic aperture in accordance with the illustrative embodiment of the invention traps particles at the surface of the aperture, rather than inside of it. As a consequence, the trapped particle can be further manipulated and processed.

Furthermore, a coaxial plasmonic aperture in accordance with the illustrative embodiment of the invention has greater transmission efficiency compared to the prior art approaches to plasmonic trapping. This high efficiency can equate to reduced power requirements.

BRIEF DESCRIPTION OF THE DRAWINGS

FIG. 1A depicts a coaxial plasmonic aperture in accordance with the illustrative embodiment of the present invention.

FIG. 1B depicts a sectioned view of the coaxial plasmonic aperture of FIG. 1A.

FIG. 2 depicts a first alternative embodiment of a coaxial plasmonic aperture in accordance with the present invention.

FIG. 3A depicts a second alternative embodiment of a coaxial plasmonic aperture in accordance with the present invention.

FIG. 3B depicts a third alternative embodiment of a coaxial plasmonic aperture in accordance with the present invention.

FIG. 5A depicts a fourth alternative embodiment of a coaxial plasmonic aperture in accordance with the present invention.

FIG. 5B depicts a fifth alternative embodiment of a coaxial plasmonic aperture in accordance with the present invention.

FIG. 7 depicts a coaxial plasmonic aperture incorporated at an end of an optical fiber.

FIG. 8 depicts a coaxial plasmonic aperture having input and output gratings and incorporated with an optical fiber.

FIG. 9 depicts the coaxial plasmonic aperture with circular gratings of FIG. 8.

DETAILED DESCRIPTION

Figure 1D:
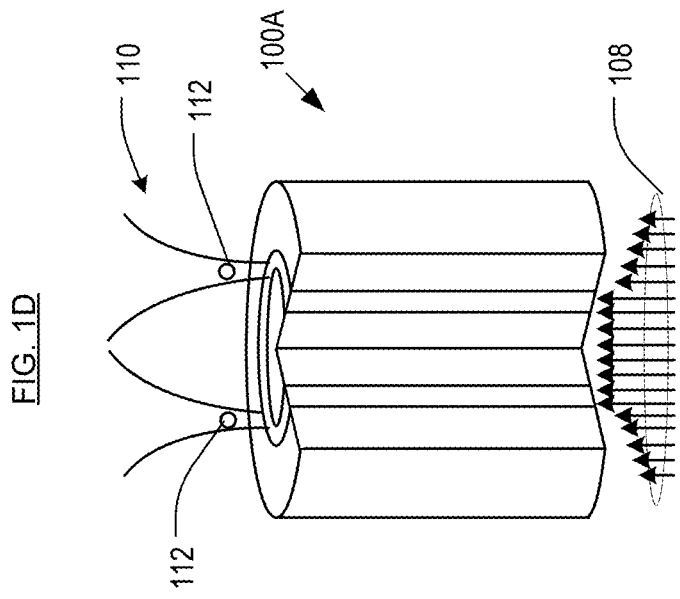
FIG. 1D depicts a particle trapped by the near field transmitted through the aperture.
Figure 1C:
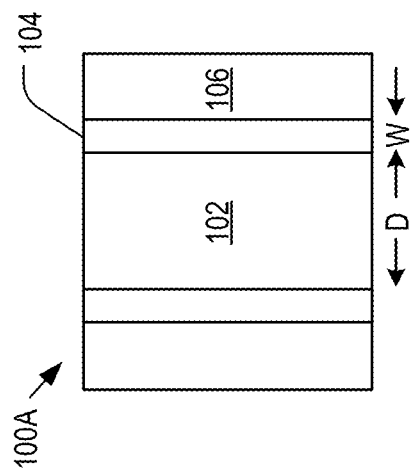
FIG. 1C depicts a cross-sectional view of the coaxial plasmonic aperture of FIG. 1A.

FIGS. 1A-1D depict coaxial plasmonic aperture 100A in accordance with the illustrative embodiment of the present invention. Coaxial plasmonic aperture 100A comprises core 102, channel 104, and cladding 106, inter-related as shown.

In some embodiments, core 102 has a cylindrical shape. In some alternative embodiments, core 102 has a polygonal perimeter. Core 102 preferably comprises a metal, more preferably a noble metal. In some alternative embodiments, highly-doped semiconductors or metals can be used. In the illustrative embodiment, core 102 comprises silver.

A change in the core material will result in a change in the plasmonic resonance frequency of coaxial plasmonic aperture 100A. Thus, changing the core material results in a shift in the operating range of coaxial plasmonic aperture 100A, which, as a function of trapping application, might be useful. Those skilled in the art, after reading this specification, will be able to determine the shift in operating range of the co-axial plasmonic aperture as a function of a change in the material of core 102 via simple experimentation as desired for use in a given application.

Channel 104 is disposed around core, in the form of an annulus or ring. The channel comprises a material that enables propagation of the electromagnetic radiation that powers the trap. The channel thus functions as the aperture.

In the illustrative embodiment, light in the visible range is used as the illumination source; as such, the channel preferably comprises a dielectric material. In the illustrative embodiment, channel 104 comprises silicon dioxide. Other dielectrics suitable for use as channel 104 when powering the trap with light in the visible range include silica, silicon oxy-nitride, silicon nitride, borosilicate, phosphosilicates, sapphire, and other glasses. In principle, any (electrical) insulator can be used, even air; however, use of any particular material will cause a shift (typically very slight) in the resonant plasmonic wavelength as a function of the refractive index of the material.

Other materials suitable for use as channel 104 include dielectrics with relatively higher refractive indices, such as gallium phosphide. The use of such materials will result in larger shifts in the resonant plasmonic wavelengths, hence resulting in a change in the optimal operating wavelength(s) of aperture 100.

In the illustrative embodiment, the coaxial plasmonic aperture 100A has a thickness T of 150 nm. This thickness is selected to ensure that no light will be transmitted through the aperture 100 at regions other than channel 104. In other words, light should not be transmitted through core 102 or cladding 106. Yet, thickness T is ideally no larger than is required for core/cladding to be opaque so that losses of optical energy through channel 104 are as low as possible. Those skilled in the art will be able to determine an acceptable thickness based on the material used as core 102/cladding 106, the material used as channel 104, and optical power constraints.

In the illustrative embodiment, core 102 has a diameter of 120 nm. The diameter of core 102 can, like materials selection, be used to affect the operating wavelength of aperture 100A. The larger core 102, the greater the red-shift in the resonant plasmonic wavelength for a given channel thickness and aperture thickness.

Also, as core 102 gets wider, so does the total diameter of aperture 100A. Increasing the total diameter of aperture 100A results in a wider trapping potential in the y-direction. See Saleh and Dionne, "Toward Efficient Optical Trapping of Sub-10-nm Particles with Coaxial Plasmonic Apertures," *Nano Lett.*, 12, p 5581-5586 (American Chemical Society 2012), which is incorporated by reference herein. As shown in FIG. 4(c) of the Saleh and Dionne article, which shows a cross section of the optical trapping potential in the y-direction, the cross section increases in width as the diameter of the aperture increases, which might be undesirable as a function of application specifics. Decreasing the diameter of the core reduces the transmission efficiency of the aperture but will result in a tighter trapping potential in the y-direction.

In the illustrative embodiment, channel 104 has a width of 25 nm. The width of the channel, at least at the input side, must be large enough to couple sufficient optical power into the channel. It is within the capabilities of those skilled in the art to determine a minimum acceptable width so as to couple sufficient optical power into channel 104. Furthermore, the width affects the size of the particle that can be trapped.

Cladding 106 surrounds channel 104. Suitable materials for cladding 106 are the same as those for core 102, although the core and the cladding do not have to be the same material. However, in typical geometries wherein two resonant plasmonic modes are coupled, the geometry is symmetric; that is, core 102 and cladding 106 will comprise the same material.

The width of cladding 106 is preferably greater than the "skin depth" of the conductor used for the cladding. As such, a width of 20 nm or more is sufficient for noble metals. Skin depths for conductors are known and those skilled in the art can set a suitable width for cladding 106 as a function of skin depth.

As previously noted, coaxial plasmonic aperture 100A exhibits certain resonant plasmonic wavelengths. These resonant wavelengths are primarily a function of the thickness T of aperture 100 and phase shifts due to reflections at the waveguide facets (i.e., the ends of channel 104). To a somewhat lesser extent, resonant plasmonic wavelengths can be altered as a function of materials choices, as previously noted. Changes in the resonant plasmonic wavelength thus change the preferred operating wavelengths of aperture 100A. The choice as to the desired operating wavelength is primarily a function of the nature of the particle(s) that are to be trapped.

Referring now to FIG. 1D, in operation, one end of coaxial plasmonic aperture 100A is illuminated with linearly polarized light in the visible range. Illuminating the coaxial plasmonic aperture results in the emission of energy from the forward edge of channel 104. The energy provides a dual-trapping potential well in which to confine a particle. Particle 112, positioned at the non-illuminated end of aperture 100A, interacts with and is trapped by near field energy 110 emitted from the edge of channel 104.

Channel 104 having a width of 25 nm is capable of trapping a 5 nm particle with optical power of less than 100 mW transmitted through the trap. This is based on a figure of 10 kT as a minimum threshold for establishing a stable optical trap. Input power requirements are based on the efficiency at which input optical power is coupled to channel 104 and the efficiency of transmission through the channel.

To trap a particle smaller than 5 nm, such as a 2-nm particle, will require substantially more power or an alternative configuration.

FIG. 2 depicts coaxial plasmonic aperture 100B, which is one such alternative configuration of the illustrative embodiment. Channel 204 of aperture 100B is tapered so that the output end of the channel is narrower than the input end. In the illustrative embodiment, the width of channel 204 narrows from 25 nm at the input end to 5 nm at the output end. Results show that using coaxial plasmonic aperture 100B, a 2 nm particle interacting with the near field 2 nm away from the output end of channel 204 experiences a trapping potential of 60 kT/100 mW (wavelength of 811 nm, particle in air), which is well above the minimum 10 kT for stable confinement. This means that only 17 mW is required to confine the particle.

In some embodiments, optically-active media is incorporated into the channel of a coaxial plasmonic aperture, such that gain is experienced therethrough. The gain profile can be controlled so that an asymmetric trapping potential is generated. This can be used to study the kinetics of individual molecules in different environments. The optically-active media can occupy some or all of the channel. Examples of optically-active media suitable for use in conjunction with the present invention include, without limitation, rare earth ions and various dyes. FIG. 3A depicts coaxial plasmonic aperture 100C having optically-active media 314 in channel 104.

In some further embodiments, electrical contacts are disposed on core 102 and cladding 106, thereby providing electrical control of aperture 102. This can be used, for example, in embodiments in which an optical-gain medium is added to the channel, wherein instead of pumping the gain medium optically, it is pumped electrically via the contacts. FIG. 3B depicts coaxial plasmonic aperture 100D having electrodes 316A and 316B for electrically pumping gain medium 314 in channel 104.

Figure 4A:
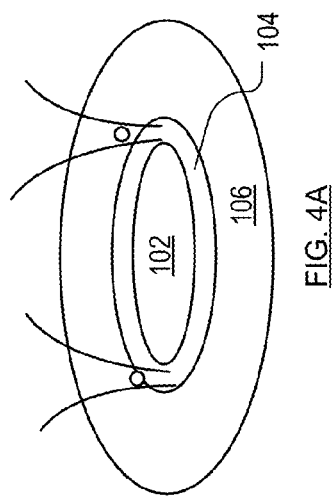
FIGS. 4A and 4B depict rotation of the position of trapped particles around the axis of the aperture by rotating the polarization direction of the linearly polarized laser that illuminates the coaxial plasmonic aperture.
Figure 4B:
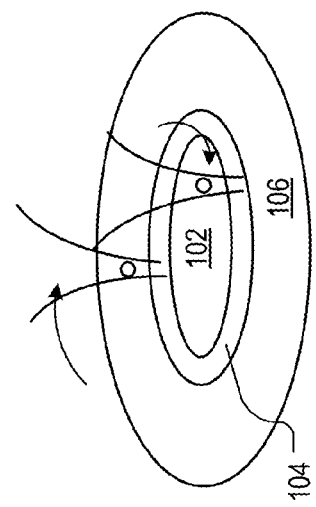

In yet some additional embodiments, the polarization of the illuminating light can be altered to manipulate a confined particle. For example, rotating the polarization direction of the linearly polarized laser that illuminates the coaxial plasmonic aperture results in rotation of the position of the trapped particle(s) around the axis of the aperture. Such rotation is depicted in FIGS. 4A and 4B, which depicts an end view of the aperture. In the case of a linearly polarized laser, for example, the polarization of the illumination light can be rotated by simply rotating the laser. Rotation can also be effected electronically.

In some further embodiments, the dimensions of the coaxial plasmonic aperture or the refractive index of the channel thereof is passively or actively modulated (such as using ferroelectric, piezoelectric, or electro-optically-active materials). This enables the trapping wavelength to be tuned. Examples of such materials include, without limitation, lithium niobate (piezoelectric), barium titanate (ferroelectric), lead titanate (ferroelectric), and the like. FIG. 5A depicts an embodiment of passively modulated coaxial plasmonic aperture 100E. FIG. 5B depicts an embodiment of an actively modulated coaxial plasmonic aperture 100F. In both of these embodiments, some or all of channel 104 includes ferroelectric, piezoelectric, or electro-optically-active material 518. Coaxial plasmonic aperture 100F includes electrodes 316A and 316B by which channel 104 is actively modulated.

Figure 6:
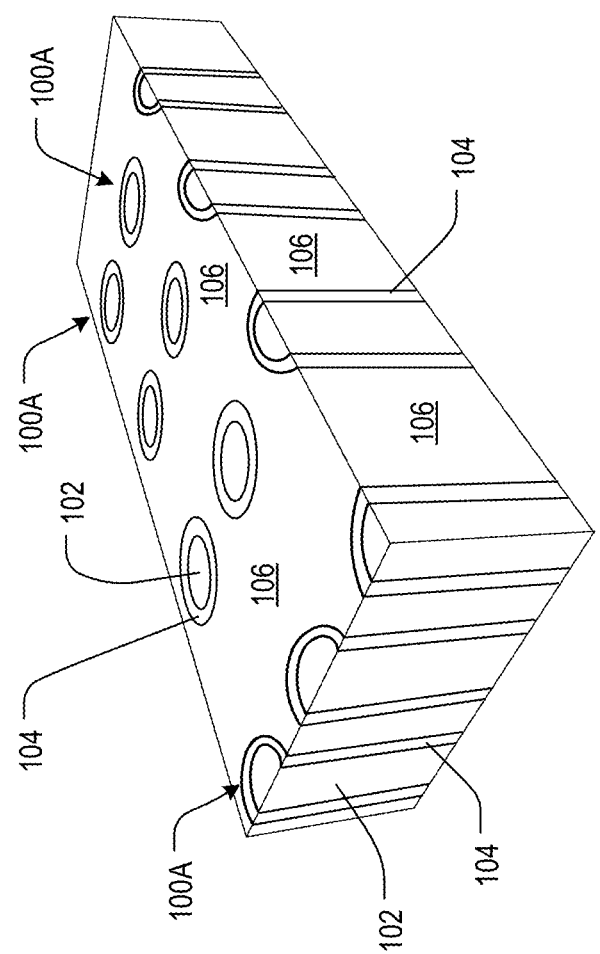
FIG. 6 depicts an array of coaxial plasmonic apertures in a planar structure.

In still further embodiments, a plurality of coaxial plasmonic apertures 100A are formed in a planar surface, such as depicted in FIG. 6, to form an in-plane array of co-axial plasmonic apertures to trap plural particles. This architecture can be used as a basis for nanoscale particle sensors and is particularly well suited for liquid purification (i.e., filtration) at the nanoscale. Furthermore, this arrangement is useful for multi-particle optical characterization and significantly enhances overall efficiency (c.a. 90 percent transmission efficiency), as well. Such planar geometries are not, however, well suited for three-dimensional manipulation of trapped particles.

In accordance with a further embodiment, a capability for 3d manipulation of a trapped particle is provided by integrating a coaxial plasmonic aperture on the tip of an optical fiber. In addition to 3d manipulation, an optical fiber-based coaxial plasmonic aperture can be used to apply highly localized optical forces on surfaces, particles, and cell membranes with high spatial resolution. This facilitates the study of physical and biological properties at the nanoscale, including, for example, adhesion forces between nanoscale particles and different surfaces and the response of cells (such as stem cells) to external forces.

FIG. 7 depicts structure 700, which comprises a coaxial plasmonic aperture, such as aperture 100A, integrated with optical fiber 720 having cladding 722 and core 724. A drawback to this design is that the transmission efficiency of the light is relatively low. For example, for a structure wherein the coaxial plasmonic aperture (version 100A) has a core diameter of 300 nm and a channel width of 50 nm, the transmission efficiency is 2.5 percent for light having a wavelength of about 760 nm.

FIG. 8 depicts structure 800, which comprises coaxial plasmonic aperture 100G having integrated input and output gratings, integrated with optical fiber 720 having cladding 722 and core 724. FIG. 9 depicts coaxial plasmonic aperture 100G without optical fiber 720.

In this embodiment, aperture 100G is formed primarily of metal, such as gold, silver, platinum, etc. More particularly, core 102 and cladding 106 are formed of metal and channel 104 is air. The shape of aperture 100G is formed by patterning the end surface of optical fiber 720. A conformal layer of material 828, e.g., metal, is then applied. The fabrication process is described in further detail later in this specification.

Figure 10A:
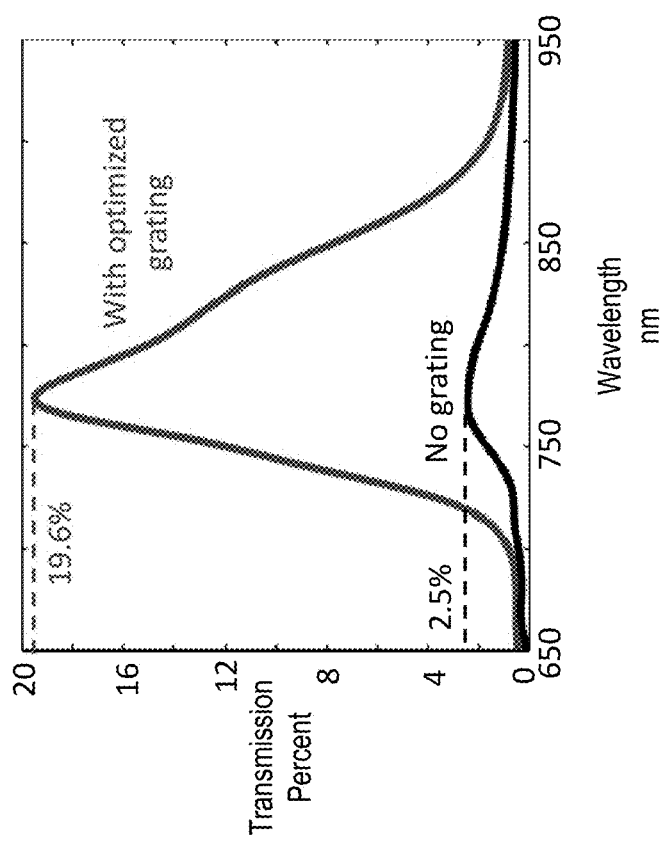
FIG. 10A depicts a comparison of the transmission efficiency of a coaxial plasmonic aperture with and without circular gratings.

The presence of grating 826 on the input side of the coaxial plasmonic aperture can significantly increase optical transmission efficiency for "optimized" grating designs. For example, as depicted in FIG. 10A, for a structure wherein the coaxial plasmonic aperture having a core diameter of 300 nm and a channel width of 50 nm, the transmission efficiency is 19.6 percent for light having a wavelength of about 760 nm. This is an improvement of a factor of eight over structure 700 depicted in FIG. 7.

Figure 10B:
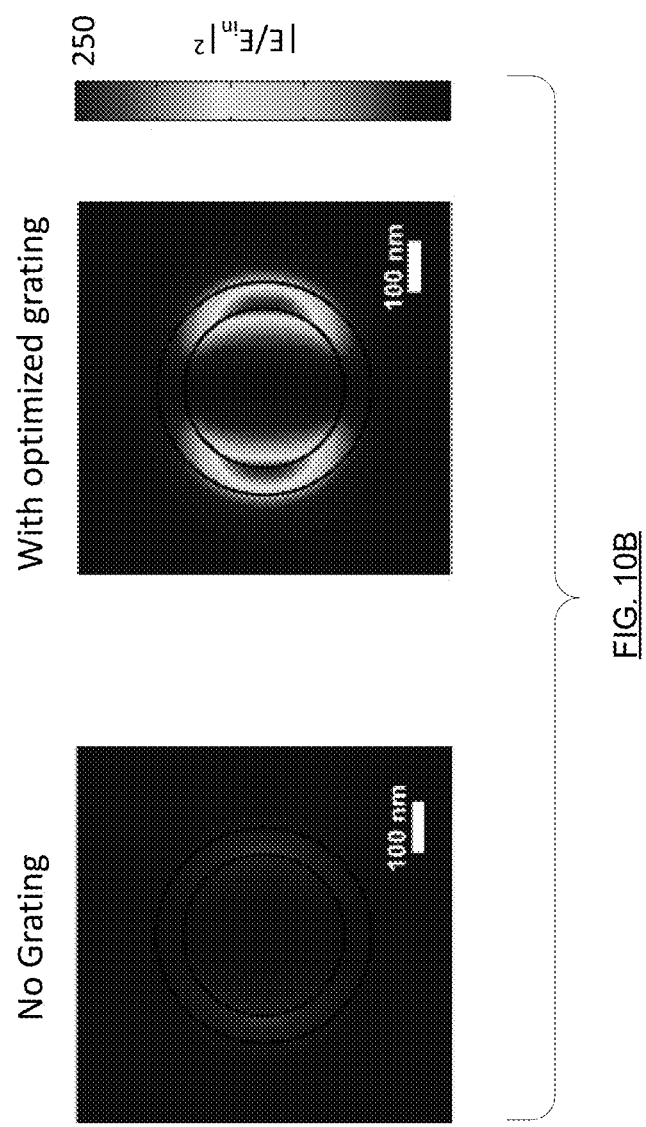
FIG. 10B depicts a comparison of the field intensity of a coaxial plasmonic aperture with and without circular gratings.
Figure 10C:
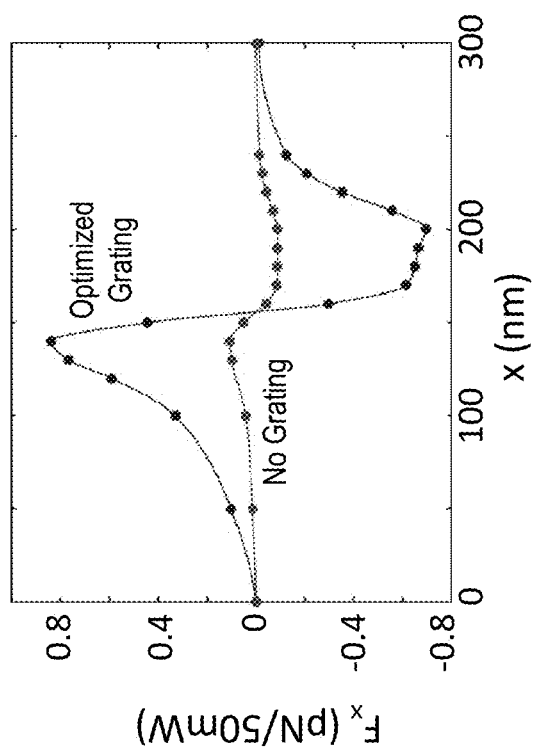
FIG. 10C depicts a comparison of one of the optical force components (X) of a coaxial plasmonic aperture with and without circular gratings.
Figure 10D:
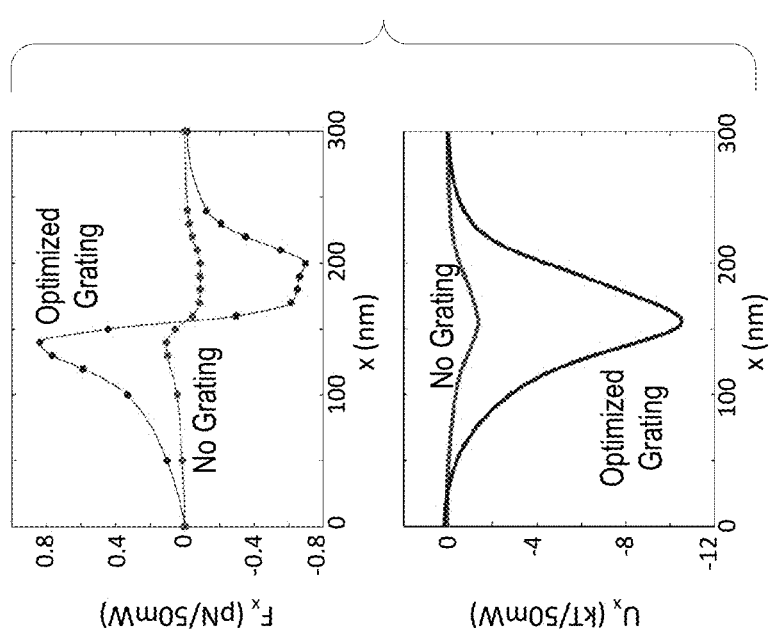
FIG. 10D depicts a comparison of one of the trapping potential of a coaxial plasmonic aperture with and without circular gratings.

The presence of grating 926 on the output side of the coaxial plasmonic aperture can significantly improve the capabilities for far-field optical trapping and manipulation for "optimized" grating designs. More particularly, the use of the output-side grating has been shown to significantly enhance the field (FIG. 10B), significantly increase optical forces (FIG. 10C), and significantly increase trapping potential (FIG. 10D).

Key design parameters for developing a grating design that provides significantly improved particle-trapping performance (i.e., defining an "optimized" grating design) relative to a grating-less aperture, include groove depth $Depth_g$, grating period P, distance to the first groove $Dist_{fg}$, and duty cycle DC of the grating (see FIG. 9). Optimization is performed numerically. In brief, the procedure is to align the resonance of grating with the resonance of the coaxial plasmonic aperture. This provides a first set of values for the key design parameters. Repeated full numerical simulations are used to converge on an "optimal" design. In light of this specification, those skilled in the art will know to develop an "optimized" grating design. It is to be understood that the word "optimal" and inflected forms thereof are not meant to indicate a "best" design; rather, this term has the meaning indicated above.

In some embodiments, only an input grating used in conjunction with the coaxial plasmonic aperture. In some other embodiments, only an output grating is used in conjunction with the coaxial plasmonic aperture.

To form a plasmonic aperture with circular gratings on the end of an optical fiber, a masking material is deposited on the end of a tapered optical fiber. The masking material may be any material that provides an acceptable etch selectivity with respect to the silicon dioxide of the fiber. Suitable materials include, without limitation, chrome, photoresist, and silicon nitride. A circular grating is next patterned in the masking material. The patterning can be performed using techniques such as focused ion beam milling, e-beam lithography, photography and etching, etc.) The masking material that remains is then removed, such that a patterned silicon dioxide is laid bare. Metal, such as silver, gold, platinum, etc., is then deposited on the patterned region of silicon dioxide.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An article comprising:
   a coaxial plasmonic aperture, wherein the coaxial plasmonic aperture includes:
      a core, wherein the core comprises a metal;
      a channel, wherein the channel surrounds the core, and wherein the channel comprises a dielectric and has a width in a range of about 5 nanometers to about 500 nanometers; and
      a cladding, wherein the cladding surrounds the channel and comprises metal; and a laser, wherein the laser is positioned to illuminate a first end of the coaxial plasmonic aperture, the first end being an input end.

2. The article of claim 1 wherein the core comprises a noble metal.

3. The article of claim 1 wherein the core comprises a metal selected from the group consisting of silver and gold.

4. The article of claim 1 wherein the cladding and the core comprise the same metal as one another.

5. The article of claim 1 wherein the channel comprises silicon dioxide.

6. The article of claim 1 wherein the core is cylindrical.

7. The article of claim 1 wherein the channel comprises a ring.

8. The article of claim 1 wherein the channel tapers from a first width at the first end of the coaxial plasmonic aperture to a second width at a second end of the coaxial plasmonic aperture, wherein the second width is less than the first width.

9. The article of claim 1 wherein the channel comprises an optical gain media.

10. The article of claim 9 wherein a first electrical contact is disposed on the core and a second electrical contact is disposed on the cladding.

11. The article of claim 1 wherein the channel comprises a material selected from the group consisting of ferroelectric, piezoelectric, and electro-optically active.

12. The article of claim 1 further comprising an optical fiber, wherein the coaxial plasmonic aperture is disposed proximal to an end of the optical fiber.

13. The article of claim 12 wherein the coaxial plasmonic aperture further comprises a circular grating disposed at the first end thereof.

14. The article of claim 12 wherein the coaxial plasmonic aperture further comprises a circular grating disposed at a second end thereof.

15. The article of claim 12 wherein the coaxial plasmonic aperture further comprises a first circular grating disposed at the first end thereof and a second circular grating disposed at a second end thereof.

16. The article of claim 1 wherein the coaxial plasmonic aperture further comprises a circular grating disposed at the first end thereof.

17. The article of claim 1 wherein the coaxial plasmonic aperture further comprises a circular grating disposed at a second end thereof.

18. The article of claim 1 wherein the coaxial plasmonic aperture further comprises a first circular grating disposed at the first end thereof and a second circular grating disposed at a second end thereof.

19. A method for trapping a particle comprising:
positioning the particle near an output end of a waveguide, the waveguide having an input end and an output end and comprising:
a core,
a channel that comprises a dielectric material and surrounds the core, the channel having a width in a range of about 5 nanometers to about 500 nm at the input end of the waveguide, and
a cladding that comprises a conductor and surrounds the channel; and
illuminating the input end of the waveguide with light.

20. The method of claim 19 and further wherein a width of the channel at the output end of the waveguide is less than a width of the channel at the input end of the waveguide.

21. The method of claim 20 wherein the operation of illuminating the input end of the waveguide with light further comprises illuminating the input end of the waveguide with linearly polarized light.

22. The method of claim 19 wherein the operation of illuminating the input end of the waveguide with light further comprises illuminating the input end of the waveguide with linearly polarized light.

23. The method of claim 22 further comprising rotating the polarization of the light.

24. The method of claim 19 further comprising applying gain to the light within the waveguide.

25. The method of claim 19 and further comprising altering a refractive index of the dielectric material.

26. The method of claim 19 and further comprising altering a dimension of the waveguide.

\* \* \* \* \*